United States Patent [19]

Templin

[11] 4,143,512
[45] Mar. 13, 1979

[54] ANTI-COLLAPSING CHAIN HAVING LOOP CENTER LINK

[75] Inventor: Harry W. Templin, Indianapolis, Ind.

[73] Assignee: FMC Corporation, San Jose, Calif.

[21] Appl. No.: 879,037

[22] Filed: Feb. 21, 1978

[51] Int. Cl.² ............................................. F16G 15/04
[52] U.S. Cl. .................................... 59/85; 74/251 C; 198/851
[58] Field of Search .................... 59/78, 84, 85, 90, 12; 74/245 C, 250 C, 251 C; 198/851, 683, 685

[56] References Cited

U.S. PATENT DOCUMENTS

| | | | |
|---|---|---|---|
| 2,860,520 | 11/1958 | Sull | 59/85 |
| 2,915,909 | 12/1959 | Boron | 59/84 |
| 3,457,721 | 7/1969 | Trudeau | 59/85 |
| 4,020,629 | 5/1977 | Wilmot | 59/85 |

FOREIGN PATENT DOCUMENTS

| | | | |
|---|---|---|---|
| 239505 | 10/1960 | Australia | 59/84 |
| 360026 | 3/1962 | Switzerland | 59/85 |
| 627251 | 8/1949 | United Kingdom | 59/78 |

Primary Examiner—C.W. Lanham
Assistant Examiner—Gene P. Crosby
Attorney, Agent, or Firm—J. W. Edwards; J. F. Verhoeven

[57] ABSTRACT

A chain has alternately arranged center links and sidebars that are interconnected by pins of a predetermined diameter. An elongated opening is provided in each center link for receiving two pins. Adjacent each end of the elongated opening, lugs project from the center link to restrict the opening opposite the lug to a transverse dimension less than the pin diameter. Each lug is spaced from an adjacent opening end by a distance enabling one pin to fit between the adjacent opening end and the lug. Each pin has a transverse groove for receiving one of the lugs when the pin is in a predetermined rotational angular relationship with the center link. Thus, the pins can be moved past the lugs, in directions to and from the adjacent ends of the elongated openings, when the pins are in the predetermined rotational angular relationship for assembly or disassembly of the chain. The lugs prevent collapsing of the chain when the predetermined rotational angular relationship is not maintained.

8 Claims, 4 Drawing Figures

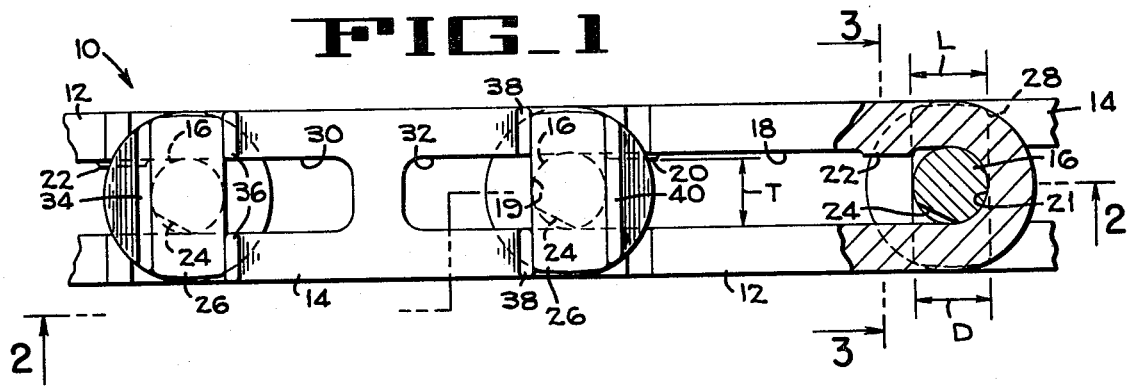
FIG_1
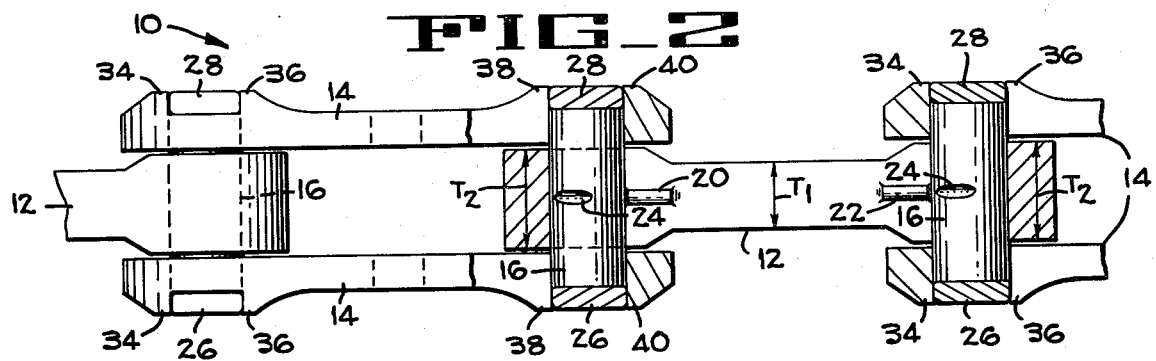
FIG_2
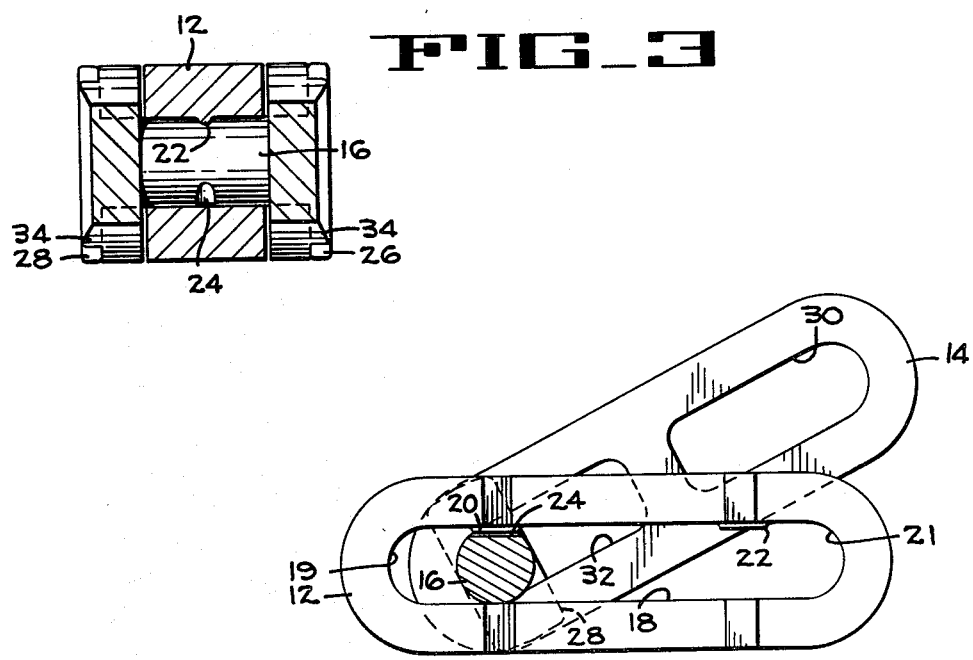
FIG_3
FIG_4

ANTI-COLLAPSING CHAIN HAVING LOOP CENTER LINK

BACKGROUND OF THE INVENTION

1. Field of the Invention

This invention relates to chains having a center link in the form of a loop, such as rivetless type chain and bar loop type chain. More specifically, the invention is directed to an anti-collapsing chain having a loop center link.

2. Description of the Prior Art

Chains having a center link in the form of a loop, such as a rivetless type chain and bar loop type chain, are used in trolley conveyor systems, long conveyors where chain weight must be considered such as retarding and assembly conveyors, flight conveyors operating in materials that would tend to pack and fully enclose chain joints, and drag conveyors. A major problem encountered with chain having loop center links is that the chain links can collapse during service. The chain is normally operated over a series of sprockets or wheels for the purpose of power transmission. Under normal operating conditions, the chain is taut and subject to a tensile load. Certain operating conditions, such as over-running loads and excessive chain accumulation on the slack strand side, enable the chain links to collapse or move together in overlapping relationship. When this happens, particularly with rivetless type chain, the links can become disassembled rendering the chain inoperable. It is desirable to maintain an open chain joint in conveyors operating in abrasive or corrosive materials that would tend to pack in fully enclosed joints. A jet of water can be directed toward the drive sprockets, and thus, flush out the open joints as the chain passes over the sprocket. It is desirable to provide an economical interlock, to prevent open joint chain from collapsing and providing the opportunity for the chain to become disassembled.

SUMMARY OF THE INVENTION

The present invention enables loop center link chain to maintain all the advantages of an open joint design along with the advantages of non-collapsing joints that eliminate the possibility of a chain becoming accidentally disassembled.

A chain has a loop center link that defines an elongated opening for receiving a pin of a predetermined diameter. A lug projects inwardly from the center link to restrict the elongated opening opposite the lug to a transverse dimension that is less than the predetermined diameter of the pin. The lug is spaced (longitudinally of the opening) from an adjacent opening end by a distance enabling the pin to fit between the adjacent opening end and the lug. Another lug, similar to the previously described lug, is provided near the end of the elongated opening opposite from the opening end adjacent the previously described lug. Pins of the predetermined diameter extend transversely through the center link and the elongated opening. Each pin has a transverse groove for receiving one of the lugs when the pin is in a predetermined rotational angular relationship with the center link. Thus, the pins can be moved past the lug in directions to and from the end of the elongated opening when the pin is in the predetermined rotational angular relationship, and when this relationship is not maintained, the lugs prevent the pins from moving towards the middle of the elongated opening to collapse the chain.

BRIEF DESCRIPTION OF THE DRAWINGS

FIG. 1 is a plan view of a chain embodying the present invention, with a portion being broken away.

FIG. 2 is a section taken on the line 2—2 of FIG. 1.

FIG. 3 is a section taken on the line 3—3 of FIG. 1.

FIG. 4 is an operational view illustrating the assembly or disassembly of the chain shown in FIG. 1.

DESCRIPTION OF THE PREFERRED EMBODIMENT

With reference to FIGS. 1 and 2, a chain 10 has alternately arranged center links 12 and sidebars 14 that are pivotally interconnected by pins 16 having a predetermined diameter D. The center links each consist of an endless loop which defines an elongated opening 18 for receiving the pins. The center links are thicker or have a greater transverse dimension at the end portions of the link than at the mid-portion of the link. Adjacent one end 19 of the elongated opening, a lug 20 projects from the center link to restrict the opening opposite the lug, to a transverse dimension T less than the pin diameter. Adjacent the opposite end 21 of the opening, a similar lug 22 projects from the center link to similarly restrict the opening. The lugs 20, 22 are spaced longitudinally of the opening, from an adjacent opening end, by a distance L (which may be substantially equal to diameter D) enabling the pin 16 to fit between the adjacent opening end and the lug, as shown in FIG. 1. At the distal ends of the lugs are flat surfaces that extend longitudinally of the elongated openings, as shown in FIG. 1. Looking now at FIG. 2, the mid-portion of the center link has a transverse dimension $T_1$ that is smaller than the transverse dimensions $T_2$ at the end portions of the center link.

Each pin 16 has a groove 24 extending transversely of the pin. This groove is formed by the removal of an arcuate segment from the pin, leaving a flat surface at the bottom of the transverse groove. The pin groove can receive one of the lugs 20, 22 when the pin is in a predetermined rotational angular relationship with the center link 12, as shown in FIG. 4. Each pin has a T-head 26 at one end and a T-head 28 at the opposite end. These T-heads fit longitudinally within the elongated opening 18, as the pin is inserted through the center link.

Each sidebar 14 has a slot 30 at one end and a slot 32 at the opposite end for receiving the T-heads 26, 28 of the pins 16. Projecting outwardly near one end of the sidebar are a shoulder 34 and a pair of shoulders 36. The shoulder 34 and 36 are spaced for receiving a pin T-head therebetween. Projecting outwardly near the opposite end of the sidebar are a pair of shoulders 38 and a shoulder 40, spaced for receiving a pin T-head therebetween. When the T-heads are positioned between the associated shoulders, the pins are interlocked to prevent rotation of the pin relative to the sidebar.

To assemble the chain 10, a pin 16 is inserted through the elongated opening 18 of a center link 12 near the mid-portion of the link having the transverse dimension $T_1$. The T-heads 26, 28 fit longitudinally with the elongated opening as the pin is inserted through the center link. Then the pin is rotated so that the T-heads extend transversely of the center portion of the center link on opposite sides thereof. The sidebars 14 are slipped over the T-heads by inserting the T-heads longitudinally into either slot 30 or 32. The sidebars are then rotated until the T-heads are received between the spaced shoulders projecting from the sidebars.

When the sidebars 14 are interlocked with the pin 16, they are rotated to the position shown in FIG. 4. In this position of predetermined angular relationship, the pin groove 24 is aligned with its bottom flat surface extending parallel to the flat surface at the distal end of the lug 20. The pin can then be moved past the lug to the opening end 19, and then the sidebars are rotated to an extended straight line position with the center link 12, as shown in FIGS. 1 and 2. In this position, the lug 20 retains the pin 16 near the opening end 19 to prevent collapsing of the chain 10. The transverse dimension $T_2$ of the center link 12 maintains the sidebars 14 in spaced relationship so that the T-heads 26, 28 are firmly held in place by the associated shoulders projecting from the sidebars. FIG. 3 illustrates how the lug 22 retains the pin 16 at the opposite end 21 of the opening 18.

The degree of rotation between straight line position of the chain 10 and the predetermined rotational angular relationship shown in FIG. 4 is about 153°. It should be understood that this angle can be varied. Preferably, the angle is more than 90°.

While the chain shown in the drawing and described herein is a rivetless type of chain, the invention can be used on bar loop type chain. Such chain has center links, similar to the rivetless type chain, with solid sidebars that are connected to pins having either rivet heads or cotter keys. A single locking flat is provided on the pins and sidebars to prevent rotation of the pin within the sidebars.

From the foregoing description, it will be seen that the anti-collapsing chain 10 having loop center links 12 provides the advantages of open joint chain along with the advantage of non-collapsing joints to prevent accidental disassembly of the chain.

Although the best mode contemplated for carrying out the present invention has been herein shown and described, it will be apparent that modification and variation may be made without departing from what is regarded to be the subject matter of the invention.

What is claimed is:

1. In a chain having a loop center link that defines an elongated opening, a predetermined diameter pin extending transversely through the center link and the elongated opening, the improvement comprising a lug projecting inwardly from the center link to restrict the elongated opening opposite the lug to a transverse dimension that is less than the predetermined diameter of the pin, said lug being spaced longitudinally of the opening from an adjacent opening end by a distance enabling the pin to fit between the adjacent opening end and the lug, said pin having a transverse groove for receiving the lug when the pin is in a predetermined rotational angular relationship with the center link, thereby enabling the pin to be moved past the lug in directions to and from the end of the elongated opening when the pin is in the predetermined rotational angular relationship and preventing collapse of the chain when the predetermined rotational angular relationship is not maintained.

2. The improved chain described in claim 1 having near the elongated opening end opposite from the opening end adjacent the previously described lug, another lug similar to the previously described lug, and another pin similar to the previously described pin.

3. A chain having alternately arranged center links and sidebars, pins of a predetermined diameter interconnecting the sidebars and the center links, said center links having elongated openings therein for receiving the pins, and lugs projecting from each center link adjacent each end of the opening to restrict the opening opposite the lug to a transverse dimension that is less than the pin diameter, each lug being spaced longitudinally of the opening from an adjacent opening end by a distance enabling one pin to fit between the adjacent opening end and the lug, each pin having a transverse groove for receiving one of the lugs when the pin is in a predetermined rotational angular relationship with the center link, thereby enabling the pins to be moved past the lugs in directions to and from the adjacent ends of the elongated openings when the pins are in the predetermined rotational angular relationship and preventing collapse of the chain when the predetermined rotational angular relationship is not maintained.

4. The chain described in claim 3 including means interlocking the pins and the sidebars to prevent rotation of the pin relative to the sidebars when the chain is completely assembled.

5. A chain described in claim 4 wherein the center links have a least transverse dimension at their midportion and a greater transverse dimension at the ends of the center link.

6. The chain described in claim 5 wherein said pin and sidebar locking means includes double T-heads on the pins and spaced shoulders projecting from the sidebars to receive the T-heads and retain the pins against rotational movement relative to the sidebars.

7. The chain described in claim 6 wherein the predetermined rotational angular relationship between the pin transverse groove and the lug for moving the pin past the lug is more than ninety degrees from the respective pin and lug positions with the sidebars extended in a straight line from the center links.

8. The chain described in claim 7 wherein the pin transverse groove is formed by the removal of an arcuate segment from the pin, said pin having a flat surface at the bottom of the transverse groove, said lug having a flat surface at its distal end, said pin and lug being in the predetermined rotational angular relationship when the flat surface at the bottom of the pin groove is aligned parallel with the flat surface at the distal end of the lug.

* * * * *